United States Patent [19]

Mizuhara

[11] Patent Number: 4,490,437
[45] Date of Patent: Dec. 25, 1984

[54] DUCTILE NICKEL BASED BRAZING ALLOY FOIL

[75] Inventor: Howard Mizuhara, Hillsborough, Calif.

[73] Assignee: GTE Products Corporation, Stamford, Conn.

[21] Appl. No.: 420,073

[22] Filed: Sep. 20, 1982

[51] Int. Cl.³ .............................................. B21H 7/00
[52] U.S. Cl. .................................... 428/606; 148/426; 148/427
[58] Field of Search .............. 420/441, 451, 452, 453, 420/457, 458, 459; 428/606; 148/409, 410, 426, 427

[56] References Cited

U.S. PATENT DOCUMENTS 1,552,769  9/1925  Smith et al. ................... 420/458
3,573,901  4/1971  Economy ..................... 420/451

Primary Examiner—R. Dean
Attorney, Agent, or Firm—Donald R. Castle

[57] ABSTRACT

Reactive metal-nickel alloys containing controlled amounts of molybdenum, chromium, iron, copper, and mixtures thereof are suitable for brazing ceramics, other non-metallic and metallic materials.

11 Claims, No Drawings

DUCTILE NICKEL BASED BRAZING ALLOY FOIL

FIELD OF INVENTION

This invention relates to brazing alloys. More particularly it relates to brazing alloys containing a reactive metal having a liquidus temperature above about 1200° C.

BACKGROUND

Alloys containing titanium are known. These alloys contain relatively high levels of titanium that is above about 7% titanium are not ductile and can not be rolled to a foil in a satisfactory manner and upon brazing contains a brittle dispersed phase.

SUMMARY OF THE INVENTION

Reactive metal-nickel alloys containing specified amounts of molybdenum, chromium, iron, copper and mixtures thereof have liquidus temperatures in the range of from about 1250° C. to about 1500° C.; are ductile and after brazing are relatively free of hard dispersed phases.

DETAILS OF PREFERRED EMBODIMENTS

For a better understanding of the present invention, together with other and further objects, advantages and capabilities thereof, reference is made to the following disclosure and appended claims in connection with the above description of some of the aspects of the invention.

The amount of the reactive metal in the alloys of this invention which also contain nickel and a third metal selected from Mo, Cr, Fe, Cu and mixtures thereof can not appreciably exceed about 5% by weight and acheive a ductile material which upon brazing is free of dispersed phases.

The amount of reactive metal in the alloys of this invention is from about 0.25% by weight to about 5% by weight, with from about 2% by weight to about 3.5% by weight being preferred. By reactive metal, within the context of this disclosure, it is meant titanium, zirconium, vanadium and mixtures thereof. With nickel alloys the reactive element can be Ti, Zr or V or a combination such as Ti-Zr, Ti-V, without affecting the ductility when the quantity of reactive elements does not exceed 4 weight percent.

The weight percent of nickel can vary from about 50% by weight to about 90% by weight. The relative amounts of nickel and the third metal are adjusted to achieve a liquidus temperature within the range of from about 1250° C. to about 1500° C.

The third metal additions include Mo, Cr, Fe, Cu and mixtures thereof. Amounts of the third metal can vary from about 1% to about 45% by weight. When Mo is utilized, it is generally added in the weight range of from about 10% by weight to about 45% by weight. When Cr is utilized the amount of Cr is generally from about 9% by weight to about 30% by weight. When Fe is utilized, the amount is generally from about 30% to about 45% by weight. When copper is utilized the amount of copper is generally from about 10% to about 45% by weight. The preferred molybdenum content is from about 25% by weight to about 35% by weight. The preferred chromium content is from about 15% by weight to about 25% by weight. The preferred iron content is from about 32% by weight to about 40% by weight. The preferred copper content is from about 15% to about 25% by weight.

Preferred four component alloys are nickel based-titanium containing alloys having from about 20% to about 30% by weight molybdenum and from about 5% to about 25% by weight of chromium.

To more fully illustrate the subject invention, the following detailed examples are presented. All parts, percentages and proportions are by weight unless otherwise indicated.

EXAMPLE 1

An alloy containing about 2% titanium, about 78% nickel and about 20% chromium is prepared and rolled to a foil having a thickness of about 10 mils. The foil is workable and ductile and is used to braze molybdenum. A brazing temperature of about 1450° C. is used. A suitable brazed joint is exhibited.

EXAMPLE 2

An alloy containing about 3% titanium, about 63% nickel, about 34% iron is prepared and rolled to a foil having a thickness of about 4 mils. The foil is cut into a ¼ inch wide ribbon and a piece of this ribbon is placed between two pieces of graphite. The assembly is heated to about 1470° C. under about $10^{-5}$ mm Hg pressure for about 10 minutes. The brazed joint is sound.

EXAMPLE 3

An alloy containing about 3% titanium, about 67% nickel, and about 30% molybdenum is prepared by conventional powder metallurgy techniques. A foil having a thickness of about 10 mils is prepared using an intermediate vacuum anneal. When placed between two pieces of graphite and brazed at about 1450° C. at $10^{-5}$ mm Hg for about 10 minutes, a suitable brazed joint is formed.

EXAMPLE 4

Following the procedure given in Example 3, an alloy containing about 3% titanium, about 50% nickel, about 27% iron and about 20% chromium is prepared in the form of a foil. The foil having a thickness of about 10 mils is suitable for brazing graphite to graphite using a brazing temperature of about 1450° C. at $10^{-5}$ mm Hg pressure and a time of about 10 minutes.

EXAMPLE 5

An alloy containing about 3% titanium, about 73% nickel, and about 24% copper is alloyed and cast into a sheet mold. The ingot is cold rolled down to 4 mil foil with intermediate anneal. The foil is placed between two pieces of 1"×1"×0.060" alumina substrates and brazed in $10^{-5}$ mm Hg vacuum at 1450° C. The brazed joint is sound.

EXAMPLE 6

An alloy containing about 3% titanium, about 26% molybdenum, about 61% nickel and about 10% chromium is prepared by vacuum induction melting and cast. The sheet ingot is rolled down to 4 mil foil. The alloy sheet is placed between 30 mil by 1"×1" molybdenum sheet and 30 mil×1"×1" alumina and vacuum brazed at $10^{-5}$ mm Hg and at about 1450° C. The brazed joint is sound.

While there has been shown and described what are at present considered the preferred embodiments of the invention, it will be obvious to those skilled in the art that various changes and modifications may be made therein without departing from the scope of the invention as defined by the appended claims.

What is claimed is:

1. An article comprising a ductile brazing alloy foil having a thickness of up to about 10 mils and having a composition consisting essentially of from about 0.25% to about 5% by weight of a reactive metal selected from the group consisting of titanium, vanadium, zirconium and mixtures thereof, from about 50% by weight to about 90% by weight of nickel and from about 1 to about 45% by weight of a third metal selected from the group consisting of iron, chromium, copper, molybdenum and mixtures thereof wherein said alloy has a liquidus temperature of from about 1250° C. to about 1500° C.

2. An article according to claim 1 wherein said reactive metal is titanium.

3. An article according to claim 2 wherein said third metal is iron in an amount of from about 30% to about 45% by weight.

4. An article according to claim 2 wherein said third metal is chromium in an amount of from about 9% to about 30% by weight.

5. An article according to claim 2 wherein said third metal is molybdenum in amounts of from about 10% by weight to about 45% by weight.

6. An article according to claim 2 wherein said third metal is copper in amount of from 10% by weight to 45% by weight.

7. An article according to claim 2 wherein said third metal is a mixture of from about 20% by weight to about 30% by weight molybdenum and about 5% by weight to about 25% by weight chromium.

8. An article according to claim 3 wherein said iron is present in amounts of about 32% by weight to about 40%.

9. An article according to claim 4 wherein said chromium is present in amounts of from about 15% to about 25% by weight.

10. An article according to claim 5 wherein said molybdenum is present in amounts of from about 25% to about 35% by weight.

11. An article according to claim 6 wherein said copper is present in amounts of from about 15% to about 25% by weight.